US006140396A

United States Patent [19]

[11] Patent Number: 6,140,396

[45] Date of Patent: Oct. 31, 2000

Sugioka et al.

[54] THERMOSETTING RESIN COMPOSITION AND PRODUCING PROCESS THEREOF

[75] Inventors: Takuo Sugioka, Suita; Keiichiro Mizuta, Takatsuki; Masahiko Kajino, Matsubara, all of Japan

[73] Assignee: Nippon Shokubai Co., Ltd., Osaka, Japan

[21] Appl. No.: 08/995,402

[22] Filed: Dec. 19, 1997

[51] Int. Cl.[7] .......... C08K 5/34

[52] U.S. Cl. .......... 524/99; 524/718

[58] Field of Search .......... 524/99, 718

[56] References Cited

U.S. PATENT DOCUMENTS 4,141,883 2/1979 Soma et al. .......... 542/401

FOREIGN PATENT DOCUMENTS 197 21 966 A1 12/1997 Germany .

10 007 918 1/1998 Japan .

WO 97 40077 10/1997 WIPO .

*Primary Examiner*—Kriellion Sanders

*Attorney, Agent, or Firm*—Nixon & Vanderhye

[57] ABSTRACT

A resin composition including N-oxyls having a specific structure and a synthetic resin, such as a vinyl ester resin, an urethane(meth)acrylate resin, an unsaturated polyester resin, a polyester(meth)acrylate resin, and acrylic syrup. A producing process of a resin composition by preparing the synthetic resin through reaction in the presence of the N-oxyls. According to the above arrangement and producing process, it has become possible to provide a resin composition having excellent physical properties, such as storage stability and curing property, and capable of suppressing the coloring over time, and hence, can be used suitably in diversified fields, and to provide a producing process of such a resin composition capable of suppressing the coloring.

6 Claims, No Drawings

THERMOSETTING RESIN COMPOSITION AND PRODUCING PROCESS THEREOF

FIELD OF THE INVENTION

The present invention relates to a thermosetting resin composition, such as a vinyl ester resin, which is capable of suppressing coloring and suitably used in diversified fields, and a producing process of such a thermosetting resin composition.

BACKGROUND OF THE INVENTION

It has been known that when a thermosetting synthetic resin (hereinafter, simply referred to as resin) is cured, the resulting resin can be made into an article exhibiting excellent corrosion resistance, chemical resistance, water resistance, mechanical properties, etc. Examples of such a resin are a vinyl ester resin, an urethane(meth)acrylate resin, an unsaturated polyester resin, a polyester(meth)acrylate resin, acrylic syrup, etc. The "thermosetting" referred in the present invention means the properties of the resin that it is cured with heating or irradiation of an active energy beam.

For example, the vinyl ester resin is generally produced by reacting an epoxy compound with an unsaturated mono-basic acid with the use of an esterification catalyst. However, since these resins and materials thereof contain reactive groups, such as vinyl groups, these resins have a problem that they readily turn into gel as the reactive groups bond to one another during the producing step or the storage.

It is known that oxygen is an effective component to prevent such unwanted gelation of the resins. Therefore, in order to prevent the gelation during the producing step, storage, or transportation, preventive measures are taken, for example, flowing a dry air through these resins, opening the container periodically, and reducing the filling rate of the resins in the storage container.

However, a part of these resins turns into a colored compound as it undergoes oxidation with oxygen flown through the resins during the reaction. Thus, the resulting resins are colored considerably. For example, their coloring degrees are 3–8 in the Gardner color scale. Moreover, even if a sufficient amount of air coexists with these resins at all times, this is not a satisfactory preventive measure against the gelation of these resins, and these resin still have a greater possibility of turning into gel during the producing step, storage, or transportation.

Various kinds of methods are discussed to prevent the gelation. For example, Japanese Laid-open Patent Application No. 107090/1977 (Tokukaisho 52-107090) discloses a method of stabilizing stored thermosetting resins by adding a living radical compound. The thermosetting resins referred therein are defined as a product obtained by dissolving a reaction product of an epoxy resin with acrylic acid and/or methacrylic acid into a polymeric unsaturated monomer.

However, the process disclosed in the above publication has a problem that the living radical compound is highly toxic and must be handled with care.

Adding well-known polymerization inhibitors, such as hydroquinone, p-methoxyphenol, t-butyl catechol, and phenothiazine, to these resins can improve the storage stability, and is known as another method for preventing the gelation.

However, the above-detailed well-known polymerization inhibitors are colored products or color the resulting thermosetting resin composition eventually. In other words, while the thermosetting resin composition is kept open to air, the polymerization inhibitors undergo oxidation with oxygen dissolved into the thermosetting resin composition and turn into a colored compound, thereby coloring the thermosetting resin composition.

Furthermore, if more than one kind of polymerization inhibitor is used, or a large amount of the polymerization inhibitor is used to further improve the storage stability, the thermosetting resin composition tends to take a longer time to turn into gel when being cured, thereby deteriorating the curing property of the resin.

Although these resins render excellent properties, the use of the same is limited because they are readily colored. They are used as materials for FRP (fiber reinforced plastic) articles, molding articles, lining, coating, etc., only when the outward appearance is not a great concern. In other words, these resins are not suitable for the use in a bath tub, a washstand counter, a gel coat, etc. where the outward appearance is of a great importance, or for the use as an active energy beam-curable resin when an excellent active energy beam-curing property is required.

To solve the above problem, Japanese Examined Patent Publication No. 34771/1991 (Tokukouhei 3-34771) discloses a process of producing a light-color vinyl ester resin in which the coloring is suppressed. More specifically, an epoxy compound, an unsaturated mono-basic acid, and an unsaturated poly-basic acid are reacted with one another using an esterification catalyst in the presence of triphenylstibine under an inert atmosphere.

Also, Japanese Examined Patent Publication No. 23232/1994 (Tokukouhei 6-23232) discloses a process of reacting an epoxy compound, an unsaturated mono-basic: acid, and an unsaturated poly-basic acid with one another using an esterification catalyst in the presence of phosphorous acid and/or diester phosphite.

However, when the vinyl ester resin is produced by the above process, or when the above process is adopted to produce an urethane(meth)acrylate resin or a polyester (meth)acrylate resin, a large amount of addition agents, such as triphenylstibine, phosphorous acid, and diester phosphite, must be used to trigger the reaction under an inert atmosphere or an oxygen lean atmosphere to confer a significant light-color property to the resulting resin. Thus, there is a problem that the materials and a reaction product readily turn into gel.

SUMMARY OF THE INVENTION

The inventors of the present invention continued the study diligently to eliminate the above problems, and discovered that a thermosetting resin composition, including N-oxyls and a synthetic resin, such as a vinyl ester resin, an urethane (meth)acrylate resin, an unsaturated polyester resin, a polyester(meth)acrylate resin, and acrylic syrup, exhibits excellent physical properties, such as storage stability and curing property, while suppressing the coloring over time, and that such a thermosetting resin composition can be used suitably in diversified fields, and achieved the present invention.

It is therefore an object of the present invention to provide a thermosetting resin composition which exhibits excellent physical properties, such as storage stability and curing property, while suppressing the coloring over time so as to remain as a light-color composition which can be used suitably in diversified fields, and a producing process of such a thermosetting resin composition.

A thermosetting resin composition of the present invention is a composition including N-oxyls and a synthetic resin and has the following properties: a storable period at 60° C. is 1 week or longer; a coloring degree is 100 or below in the Hazen color scale; a coloring degree before the storage at 60° C. and a coloring degree right before the gelation when stored at 60° C. are 100 or below in the Hazen color scale; a difference between the coloring degrees in the Hazen color scale right before the gelation when stored at 60° C. and before the storage at 60° C. is 20 or smaller; and the maximum exothermic temperature is 100° C. or higher while the curing properties of a mixture of 1 part by weight of 1,1,3,3-tetramethylbutylperoxy-2-ethylhexylhexanoate and 100 parts by weight of the composition are measured at 70° C.

Also, the thermosetting resin composition of the present invention includes a synthetic resin and N-oxyls expressed by General Formula (1):

(1)

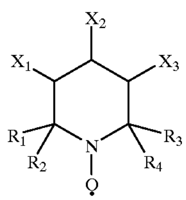

where each of $X_1$ through $X_3$ represents a hydrogen atom or an —$OR_5$ group, each of $R_1$, $R_2$, $R_3$, and $R_4$ represents an alkyl group having at least one carbon atom, and $R_5$ in the —$OR_5$ group represents a hydrogen atom or an alkyl group having up to 16 carbon atoms.

In the above thermosetting resin composition, the synthetic resin can be any kind of resin having an unsaturated bond, such as double bond, so that it can undergo the polymerization or crosslinking reaction. However, it is preferable that the synthetic resin is at least one kind of resin selected from a group consisting of a vinyl ester resin, an urethane(meth)acrylate resin, an unsaturated polyester resin, a polyester(meth)acryalte resin, and acrylic syrup. Also, in the above thermosetting resin composition, it is preferable that a ratio of the N-oxyls with respect to 100 parts by weight of the synthetic resin is in a range between 0.00001 part by weight and 1 part by weight.

According to the present invention, a thermosetting resin composition having the excellent storage stability as well as the excellent coloring resistance before the storage and the excellent curing property can be provided. Thus, the thermosetting resin composition can be suitably used in diversified fields as materials for FRP articles, molding articles, lining, coating, etc., particularly, in a bath tub, a washstand counter, a gel coat, etc. where the outward appearance is of a great importance, or as an active energy beam-curable resin when an excellent active energy beam-curing property is required.

The above-mentioned producing process of a thermosetting resin of the present invention is a process of reacting a component, out of which the thermosetting resin is made, in the presence of the N-oxyls.

In the above producing process, it is preferable that the thermosetting resin is at least one kind of resin selected from a group consisting of a vinyl ester resin, an urethane(meth) acrylate resin, and a polyester(meth)acryalte resin. Also, in the above producing process, it is preferable that an amount of use of the N-oxyls with respect to 100 parts by weight of the thermosetting resin is in a range between 0.00001 part by weight and 1 part by weight.

In addition, N-oxyls of the same kind as the one used while the thermosetting resin composition is produced or N-oxyls of a different kind may be added to the thermosetting resin composition after it is produced.

According to the above process, a light-color thermosetting resin can be produced efficiently in a stable manner without impairing the excellent physical properties of the thermosetting resin, such as corrosion resistance, chemical resistance, water resistance, heat resistance, and mechanical properties.

Further objects, characteristics and advantages of the present invention will be fully understood by the following description. Also, the effects of the present invention will be explained clearly in the following description.

In the following, an example embodiment of the present invention will be explained in detail.

A thermosetting resin composition of the present invention includes the aforementioned N-oxyls and a synthetic resin, such as a vinyl ester resin, an urethane(meth)acrylate resin, an unsaturated polyester resin, a polyester(meth) acrylate resin, and acrylic syrup (hereinafter, simply referred to as resin(s)). The thermosetting resin composition can be readily obtained by adding the N-oxyls to these resins, or adjusting these resins by reacting a component (material), out of which the resins are made, in the presence of the N-oxyls and subsequently mixing the adjusted resins with another kind of resin, a reactive monomer or the like as occasion demands.

It is preferable that a storable period of the thermosetting resin composition at 60° C. is 1 week or longer. The resin composition is generally stored in a cold and dark place, but the temperature of the resin composition may possibly rise to 40° C. during the summer. Therefore, it is more preferable that a storable period of the thermosetting resin composition at 40° C. is 2 months or longer. If the thermosetting resin composition has a storable period of 2 months or longer at 40° C., the thermosetting resin composition is assumed to have a storable period of at least 6 months if stored in a dark place at normal temperature. Such a thermosetting resin composition will cause no problem when distributed as a commercial product.

It is preferable that the coloring degree of the thermosetting composition is 100 or below in the Hazen color scale, and more preferably, 50 or below. Because when the coloring degree is 50 or below, no color is observed in the composition through visual inspection. It is preferable that a difference between the coloring degrees in the Hazen color scale right before the gelation while being stored at 60° C. and before the storage is 20 or smaller.

It is also preferable that the maximum exothermic temperature while the curing property is measured at 70° C. is 100° C. or higher, and more preferably 150° C. or higher. Because when the maximum exothermic temperature is 150° C. or higher, the mechanical property and corrosion resistance of a thermosetting material in the resin composition can be ensured further.

Examples of the N-oxyls used in the present invention include, but not limited to: 1-oxyl-2,2,6,6-tetramethylpiperidine, 1-oxyl-2,2,6,6-tetramethylpiperidine-4-ol, 4-methoxy-2,2,6,6-tetramethylpiperidine-1-oxyl, 1-oxyl-2,2,6,6,-tetramethylpiperidine-4-yl-acetate, 1-oxyl-2,2,6,6-tetramethylpiperidine-4-yl-2-ethylhexanoate, 1-oxyl-2,2,6,6-tetramethylpiperidine-4-yl-stearate, 1-oxyl-2,2,6,6-tetramethylpiperidine-4-yl-4-t-butylbenzoate, bis(1-oxyl-2,2,6,6-tetramethylpiperidine-4-yl) succinate, bis(1-oxyl-2,2,6,6-tetramethylpiperidine-4-yl) adipate, bis(1-oxyl-2,2,6,6- tetramethylpiperidine-4-yl)sebacate, bis(1-oxyl-2,2,6,6-tetramethylpiperidine-4-yl)n-butyl malonate ester, bis(1-oxyl-2,2,6,6-tetramethylpiperidine-4-yl)phthalate, bis(1-oxyl-2,2,6,6-tetramethylpiperidine-4-yl)isophthalate, bis(1-oxyl-2,2,6,6-tetramethylpiperidine-4-yl)terephthalate, bis(1-oxyl-2,2,6,6-tetramethylpiperidine-4-yl) hexahydroterephthalate, N,N'-bis(1-oxyl-2,2,6,6-tetramethylpiperidine-4-yl)adipamide, N-(1-oxyl-2,2,6,6-tetramethylpiperidine-4-yl)caprolactam, N-(1-oxyl-2,2,6,6-tetramethylpiperidine-4-yl)dodecyl succinimide, 2,4,6-tris-[N-butyl-N-(1-oxyl-2,2,6,6-tetramethylpiperidine-4-yl)]-s-triazine, 1-oxyl-2,2,6,6-tetramethylpiperidine-4-one, etc. One member or a mixture of two or more members selected from these example N-oxyls can be used effectively.

In the present invention, 4-hydroxy-2,2,6,6-tetramethylpiperidine-1-oxyl and 4-methoxy-2,2,6,6-tetramethylpiperidine-1-oxyl are preferred as the N-oxyls, because they are less toxic and easy to handle; moreover, they can ensure storage stability with an addition of a small amount.

The resin used in the present invention is not especially limited, but preferably at least one kind of resin selected from a group consisting of a vinyl ester resin, an urethane (meth)acrylate resin, an unsaturated polyester resin, a polyester(meth)acrylate resin, and acrylic syrup. Of all these resins, the vinyl ester resin is most preferred.

The vinyl ester resin is not especially limited, and for example, can be of any kind obtained by reacting an epoxy compound with an unsaturated mono-basic acid using an esterification catalyst.

The epoxy compound used as a material of the vinyl ester resin is not especially limited as long as it is a compound having at least one epoxy group within a molecule, and examples of which include:

an epibis-type glycidyl ether epoxy resin obtained through a condensation reaction of bisphenols, such as bisphenol A and bisphenol S, with epihalohydrin;

a novolac type glycidyl ether epoxy resin obtained through a condensation reaction of epihalohydrin with novolac which is a condensate of phenol, cresol, or bisphenol with formalin;

a glycidyl ester epoxy resin obtained through a condensation reaction of tetrahydrophthalic acid, hexahydrophthalic acid, or benzoic acid with epihalohydrin;

a glycidyl ether epoxy resin obtained through a condensation reaction of hydrogenated bisphenol or glycols with epihalohydrin;

an amine-containing glycidyl ether epoxy resin obtained through a condensation reaction of hydantoin or cyanuric acid with epihalohydrin; etc.

Alternatively, the epoxy compound may be a compound having an epoxy group within a molecule as a result of an additional reaction of the above example epoxy resins with poly-basic acids and/or bisphenols. One member or a mixture of two or more members selected from these example epoxy compounds can be used effectively.

The unsaturated mono-basic acid used as a material of the vinyl ester resin is not especially limited, and examples of which include: acrylic acid, methacrylic acid, crotonic acid, etc. Alternatively, the unsaturated mono-basic acid may be half-esters, such as maleic acid and itaconic acid. Further, compounds, for example, poly-carboxylic acids, such as fumaric acid, itaconic acid, and citraconic acid, saturated mono-carboxylic acids, such as acetic acid, propionic acid, lauric acid, and palmitic acid, saturated poly-carboxylic acids, such as phthalic acid and anhydrides thereof, saturated/unsaturated alkyd having a carboxylic group at the terminal end, may be used in addition to the aforementioned compounds. One member or a mixture of two or more members from these example unsaturated mono-basic acids can be used effectively.

Examples of the esterification catalyst include, but not limited to:

tertiary amines, such as dimethylbenzyl amine and tributyl amine;

quaternary ammonium salts, such as trimethylbenzyl ammonium chloride;

inorganic salts, such as lithium chloride and chromium chloride;

imidazole compounds, such as 2-ethyl-4-methylimidazole;

phosphonium salts, such as tetramethylphosphonium chloride, diethylphenylpropylphosphonium chloride, triethylphenylphosphonium chloride, benzyltriethylphenylphosphonium chloride, dibenzylethylmethylphosphonium chloride, benzilmethyldiphenylphosphonium chloride, and tetraphenylphosphonium bromide;

secondary amines;

tetrabutyl urea;

triphenylphosphine;

tritolylphosphine;

triphenylstibine; etc.

Of all these examples, quaternary ammonium salts, inorganic salts, phosphonium salts, triphenylphosphine, and triphenylstibine are preferred, because the resulting resin exhibits a lower coloring degree. One member or a mixture of two or more members selected from these example esterification catalysts can be used effectively.

The urethane(meth)acrylate resin is not especially limited, and for example, can be obtained by reacting polyisocyanate with a polyhydroxy compound or polyhydric alcohols and then reacting the resulting compound with a (meth)acrylic compound containing a hydroxyl group and optionally an allyl ether compound containing a hydroxyl group. Alternatively, after the (meth)acrylic compound containing a hydroxyl group is reacted with a polyhydroxy compound or polyhydric alcohols, the resulting compound may be further reacted with polyisocyanate.

Polyisocyanate used as a material of the urethane(meth) acrylate resin is not especially limited, and examples of which include: 2,4-tolylenediisocyanate and isomers thereof, diphenylmethanediisocyanate, hexamethylenediisocyanate, isophoronediisocyanate, xylylenediisocyanate, hydrogenated xylylenediisocyanate, dicyclohexylmethanediisocyanate, tolidinediisocyanate, naphthalinediisocyanate, triphenylmethanetriisocyanate, Desmodur L of Sumitomo Bayer Inc., Coronate L of Nippon Polyurethane Industry Co., Takenate D102 of Takeda Chemical Industries, Ltd., Isonate 143L of Mitsubishi Chemical Industries Ltd., etc. Aliphatic diisocyanates represented by hexamethylenediisocyanate and alicyclic diisocyanates represented by hydrogenated xylylenediisocyanate and dicyclohexylmethanediisocyanate are preferred, because the resulting resin exhibits a lower coloring degree. One member or a mixture of two or more members selected from these example polyisocyanates can be used effectively.

Examples of polyhydric alcohols used as a material of the urethane(meth)acrylate resin include, but not limited to: ethylene glycol, diethylene glycol, triethylene glycol, polyethylene glycol, propylene glycol, dipropylene glycol, polypropylene glycol, 2-methyl-1,3-propanediol, 1,3-butanediol, an adduct of bisphenol A with propylene oxide or ethylene oxide, 1,2,3,4-tetrahydroxybutane, glycerol, trimethylolpropane, 1,3-propanediol, 1,2-cyclohexane glycol, 1,3-cyclohexane glycol, 1,4-cyclohexane glycol, paraxylene glycol, bicyclohexyl-4,4'-diol, 2,6-decalin glycol, 2,7-decalin glycol, etc. One member or a mixture of two or more members selected from these example polyhydric alcohols can be used effectively.

Examples of the polyhydroxy compound used as a material of the urethane(meth)acrylate resin include, but not limited to, polyesterpolyol, polyetherpolyol, etc. More specifically, examples include: adducts of glycerol and ethylene oxide, glycerol and propylene oxide, glycerol and tetrahydrofuran, glycerol and ethylene oxide and propylene oxide, trimethylolpropane and ethylene oxide, trimethylolpropane and propylene oxide, trimethylol propane and tetrahydrofuran, trimethylolpropane and ethylene oxide and propylene oxide, pentaerythritol and ethylene oxide, pentaerythritol and propylene oxide, pentaerythritol and tetrahydrofuran, pentaerythritol and ethylene oxide and propylene oxide, dipentaerythritol and ethylene oxide, dipentaerythritol and propylene oxide, dipentaerythritol and tetrahydrofuran, dipentaerythritol and ethylene oxide and propylene oxide, etc. One member or a mixture of two or more members selected from these example polyhydroxy compounds can be used effectively.

Although the (meth)acrylic compound containing a hydroxyl group used as a material of the urethane(meth) acrylate resin is not especially limited, (meth)acrylic ester containing a hydroxyl group is preferable, and examples of which include: 2-hydroxyethyl(meth)acrylate, 2-hydroxypropyl(meth)acrylate, 3-hydroxybutyl(meth) acrylate, polyethylene glycol mono(meth)acrylate, polypropylene glycol mono(meth)acrylate, di(meth)acrylate of tris (hydroxyethyl)isocyanuric acid, pentaerythritol tri(meth) acrylate, etc. One member or a mixture of two or more members selected from these example (meth)acrylic compounds containing hydroxyl groups can be used effectively.

Examples of the allyl ether compound containing a hydroxyl group used as a material of the urethane(meth) acrylate resin include, but not limited to: ethylene glycol monoallyl ether, diethylene glycol monoallyl ether, triethylene glycol monoallyl ether, polyethylene glycol monoallyl ether, propylene glycol monoallyl ether, dipropylene glycol monoallyl ether, tripropylene glycol monoallyl ether, polypropylene glycol monoallyl ether, 1,2-butylene glycol monoallyl ether, 1,3-butylene glycol monoallyl ether, hexylene glycol monoallyl ether, octylene glycol monoallyl ether, trimethylol propane diallyl ether, glycerine diallyl ether, pentaerythritol triallyl ether, etc. One member or a mixture of two or more members selected from these example allyl ether compounds containing hydroxyl groups can be used effectively.

The unsaturated polyester resin is not especially limited, and for example, can be obtained through a condensation reaction of a di-basic acid and polyhydric alcohols.

Examples of the di-basic acid used as a material of the unsaturated polyester resin include, but not limited to:

α, β-unsaturated di-basic acids, such as maleic acid, maleic anhydride, fumaric acid, itaconic acid, and itaconic anhydride;

saturated di-basic acids, such as phthalic acid, phthalic anhydride and a halide thereof, isophthalic acid, terephthalic acid, tetrahydrophthalic acid, tetrahydrophthalic anhydride, hexahydrophthalic acid, hexahydrophthalic anhydride, hexahydroterephthalic acid, hexahydroisophthalic acid, succinic acid, malonic acid, glutanic acid, adipic acid, sebacic acid, 1,10-decanedicarboxylic acid, 2,6-naphthalenedicarboxylic acid, 2,7-naphthalenedicarboxylic acid, 2,3-naphthalenedicarboxylic acid, 2,3-naphthalenedicarboxylic anhydride, 4,4'-bisphenyldicarboxylic acid, and dialkyl esters of these acids; etc.

One member or a mixture of two or more members selected from these example di-basic acids can be used effectively.

The polyhydric alcohols used as a material of the unsaturated polyester resin may be the same as the aforementioned example polyhydric alcohols, and are not especially limited. One member or a mixture of two or more members selected from these example polyhydric alcohols can be used effectively. Alternatively, a dicyclopentadiene compound may be incorporated into the resin structure as occasion demands.

The polyester(meth)acrylate resin is not especially limited, and can be obtained by, for example, reacting a (meth)acrylic compound with the terminal end group of the saturated/unsaturated polyester. Examples of a material of the polyester are the same as the example compounds specified as the material of the unsaturated polyester resin.

Examples of the (meth)acrylic compound used as a material of the polyester(meth)acrylate resin include, but not limited to, unsaturated mono-basic acids, such as an unsaturated glycidyl compound and (meth)acrylic acid. One member or a mixture of two or more members selected from these example (meth)acrylic compounds can be used effectively.

The acrylic syrup is not especially limited, and can be obtained by, for example, partially polymerizing a monomeric component (mixture of materials) containing (meth) acrylic ester and optionally a vinyl compound, or adding a monomer, such as (meth)acrylic ester and a vinyl compound, to a polymer made by polymerizing the monomeric component. Although a thermoplastic resin can be used as the acrylic syrup, a thermosetting resin is preferred.

Examples of the (meth)acrylic ester include, but not limited to: methyl(meth)acrylate, ethyl(meth)acrylate, propyl(meth)acrylate, butyl(meth)acrylate, 2-ethylhexyl (meth)acrylate, lauryl(meth)acrylate, cyclohexyl(meth) acrylate, glycidyl(meth)acrylate, etc. One member or a mixture of two or more members selected from these example (meth)acrylic esters can be used effectively.

Examples of the vinyl compound include, but not limited to: styrene, α-methyl styrene, vinyl toluene, chlorostyrene, vinyl acetate, allyl alcohol, ethylene glycol monoallyl ether, propylene glycol monoallyl ether, etc. One member of a mixture of two or members selected from these example vinyl compounds can be used effectively.

The blending conditions or the like of the materials when obtaining the resin, such as the vinyl ester(meth)acrylate resin, unsaturated polyester resin, polyester(meth)acrylate resin, and acrylic syrup, are not especially limited, and can be cured arbitrarily depending on the desired physical properties of the resin.

The reactive monomer used as a component of the thermosetting resin is not especially limited, and can be selected arbitrarily depending on the object and intended use, and examples of which include: styrene, divinyl benzene, chlorostyrene, (meth)acrylic ester, diallylphthalate, vinyl acetate, etc. One member or a mixture of two or more members selected from these example reactive monomers can be used effectively. Also, a monofunctional monomer alone or a mixture of a monofunctional monomer and a polyfunctional monomer can be used effectively. These reactive monomers can be used as a solvent when the resin is synthesized or as a solvent to adjust the viscosity of a high viscous resin.

An adding method of the N-oxyls is not especially limited, and the N-oxyls can be added to the synthetic resin after the resin is synthesized, for example, before or after the reactive monomer or other kinds of resins are mixed, or the N-oxyls can be mixed with the resin material before the polymerization, etc.

In any case, it is preferable that an adding amount of the N-oxyls with respect to 100 parts by weight of the resin is in a range between 0.00001 part by weight and 1 part by weight, and more preferably in a range between 0.001 part by weight and 0.05 part by weight. An adding amount less than 0.00001 part by weight is not preferable, because the effect of adding the N-oxyls, such as the improved storage stability and coloring resistance, can not be attained. On the other hand, an adding amount exceeding 1 part by weight is not preferable either, because the curing property of the resin may be lost.

The thermosetting resin composition of the present invention may optionally include adducts of various kinds, such as a polymerization inhibitor other than the N-oxyls, a hardening agent, a hardening promoter, a thixotropy agent, a thixotropy promoter, a solvent, a filler, an UV ray absorber, pigments, a thickener, a thinner, a low contracting agent, an anti-foamer, an anti-oxidant, a plasticizer, an aggregate, a flame retarder, and a reinforcer as sub-materials. An adding amount of these adducts is not especially limited.

In the present invention, using the N-oxyls can improve the storage stability of the thermosetting resin composition significantly. When the thermosetting resin composition includes the N-oxyls, the gelation can be prevented even when an amount of use of oxygen is reduced or no oxygen is used during the producing step, storage, or transportation. Thus, according to the present invention, the jobs for preventing the gelation during the producing step, storage, or transportation, such as flowing a dry air through the resin or opening the container periodically, can be omitted, thereby making it possible to improve the work efficiency.

A producing process of a thermosetting resin of the present invention is a process of preparing the thermosetting resin by reacting a component, out of which the thermosetting resin is made, that is, a material of the thermosetting resin, in the presence of N-oxyls. The producing process of the present invention is not limited to particular kinds of thermosetting resins, and can be applied to produce general thermosetting resins. The producing process of the present invention is especially suitable as the producing process of one kind of thermosetting resin selected from a group consisting of the vinyl ester resin, urethane(meth)acrylate resin, and polyester(meth)arylate resin.

An amount of the N-oxyls existing in the reaction series, that is, an amount of use, is not especially limited, but preferably in a range between 0.00001 part by weight and 1 part by weight, and more preferably, in a range between 0.001 part by weight and 0.05 part by weight, with respect to 100 parts by weight of the resulting thermosetting resin. Using less than 0.00001 part by weight of the N-oxyls is not preferable, because the gelation preventing effect during the producing step can not be attained, and there possibly occur a producing problem caused by the gelation. On the other hand, using more than 1 part by weight of the N-oxyls is not preferable either, because the curing property of the resulting resin can be lost even if the resin has not turned into gel during the producing step.

A method of letting the N-oxyls coexist in the reaction series is not especially limited. For example, a material of the thermosetting resin is charged to a reactor, and heated to a predetermined temperature (reaction temperature) with stirring, and the N-oxyls are supplied after the temperature has risen to the reaction temperature, or the N-oxyls are supplied into the material of the thermosetting resin and mixed with each other in advance, after which the reaction is carried out, etc.

In the present invention, blending conditions or the like of the materials of the thermosetting resin are not especially limited, and can be set arbitrarily depending on the desired physical properties of the thermosetting resin. A reaction temperature of each reaction is not especially limited, and can be set arbitrarily, so that each reaction takes place effectively. For example, a reaction temperature when the epoxy compound is reacted with the unsaturated mono-basic acid using the esterification catalyst in the presence of the N-oxyls is not especially limited, but preferably in a range between 60° C. and 150° C. A reaction time is not especially limited either, and can be set arbitrarily to complete the reaction depending on a combination or the kinds of the materials, an amount of use, reaction temperature, etc. Further, a reaction pressure is not especially limited, and each reaction can take place in a normal (ambient), reduced, or applied pressure.

A polymerization conditioner (polymerization inhibitor) other than the N-oxyls, a solvent, or a reactive monomer can be used for each reaction as occasion demands. Examples of the polymerization conditioner include, but not limited to: hydroquinone, methylhydroquinone, methoxyhydroquinone, t-butylhydroquinone, benzoquinone, catechol, copper naphthenate, copper powders, etc. An amount of use of the polymerization conditioner is not especially limited, either. In case of adding the polymerization inhibitor, it is preferable to limit an adding amount thereof with respect to 100 parts by weight of the resin to 0.005 part by weight or less and to also add 0.00001–1 part by weight of the N-oxyls, because the change of the coloring degree of the resin composition over time can be reduced.

Each reaction can take place with or without a solvent. The kinds and an amount of use of the solvent are not especially limited.

The reactive monomer is not especially limited, and can be selected arbitrarily depending on the object and intended use, and examples of which include: styrene, divinyl benzene, chlorostyrene, (meth)acrylic ester, diallylphthalate, vinyl acetate, etc. One member or a mixture of two or more members selected from these example reactive monomers can be used effectively. Also, a monofunctional monomer alone or a mixture of a monofunctional monomer and a polyfunctional monomer can be used effectively. These reactive monomers can be used as a solvent when the thermosetting resin is synthesized or as a solvent to adjust the viscosity of a high viscous thermosetting resin.

DESCRIPTION OF THE EMBODIMENTS

In the following, the present invention will be explained in detail by way of Examples and Comparative Examples. However, the present invention is not limited to the disclosure below. The coloring degree, curing property, and storable period are measured in the manners described below. Also, "part(s)" and "%" referred in Examples and Comparative Examples mean "part(s) by weight" and "percent by weight", respectively, unless otherwise specified.

(a) Storable Period

Here, 600 ml of a resin composition is charged to each of two screw-cap vials with a capacity of 650 ml while leaving a small space inside, and the screw-cap vials are kept upright in the constant temperature baths at 60° C. and 40° C., respectively. Whether the resin composition has turned into gel or not is checked every day for the screw-cap vial kept at 60° C. and every 10 days or so for the other screw-cap vial kept at 40° C. More specifically, the screw-cap vial is placed upside down, and if air in the space inside the screw-cap vial goes up from the bottom to the top thoroughly in the form of bubbles, it is judged that the resin composition has not turned into gel. If any of the bubbles stop somewhere in the middle, it is judged that the resin composition has turned into gel.

The number of days since each screw-cap vial is first placed in the constant temperature bath until the day before when the gelation of the resin composition is acknowledged is defined as the storable period of the resulting resin composition herein.

(b) Coloring Degree

The coloring degree of each kind of the thermosetting resin composition is evaluated in the Hazen color scale. The Hazen color scale is measured in accordance with JIS K 6901. To begin with, 2.49 g of platinum potassium chloride (reagent grade) and 2.00 g of cobalt chloride (reagent grade) are dissolved separately into 200 ml of hydrochloric acid (reagent grade), and each is diluted to 2000 ml with distilled water, whereby two kinds of standard liquids are prepared. Then, the standard liquids are dissolved into each other in the ratios specified in JIS K 6901, whereby Hazen color scale standard liquids are obtained.

The Hazen color scale standard liquids and thermosetting resin composition are separately poured into transparent flat bottom glass tubes, each having a bore diameter of 23 mm and equipped with a stopper, to the height of 100 mm, and the glass tubes are placed upright on a white plate. Then, the Hazen color scale standard liquids and the resin composition in their respective flat bottom glass tubes are compared visually from above under the diffused daylight. The Hazen color scale standard liquid having the density closest to the density of the test thermosetting resin composition is selected, and the color scale of the selected standard liquid is defined as the Hazen color scale of the thermosetting resin composition herein.

Each resin before being stored to measure the storable period at 40° C. and 60° C. is defined as the resin before storage, and the coloring degree of the same is measured in the above manner.

Further, when the gelation is first acknowledged during the measurement of the storable period at 60° C., the supernatant of the resin through which the bubbles goes up is placed aside as the resin right before the gelation, and the coloring degree of the same is measured in the above manner.

(c) Curing Property

The curing property of each kind of the resin composition is measured in accordance with JIS K 6901.

The curing property is measured in the following manner. To begin with, 100 parts of a resin composition and 2 part of Percure WO of Nippon Oil and Fats Co., Ltd. serving as a curing agent are charged to a beaker, and mixed with each other with stirring, whereby a mixture is obtained. Percure WO used herein is a 50% diluted solution of 1,1,3,3-tetramethylbutylperoxy-2-ethylhexylhexanoate with dioctylphthalate.

Then, the mixture is charged to a 18-mm-dia test tube to the height of 100 mm, and the test tube is kept in a constant temperate bath maintained at 70° C. A time since the temperature of the mixture rises from 55° C. to 75° C. with a reaction heat is measured, which is defined as a gelation time herein. Also, the highest temperature of the mixture is defined as a maximum exothermic temperature, and a time since the temperate of the mixture rises from 55° C. to the maximum exothermic temperatures is defined as the minimum curing time herein.

EXAMPLE 1

Here, 2500 g of a bisphenol epoxy resin (YD-901 of Tohto Chemical Inc., hereinafter referred to as YD-901) corresponding to 465 epoxy equivalents, and 580 g of another kind of bisphenol epoxy resin (YD-127 of Tohto Chemical Inc., hereinafter referred to as YD-127) corresponding to 185 epoxy equivalents, 750 g of methacrylic acid which is one kind of the unsaturated mono-basic acid, 0.600 g of 2,2-methylene-bis(4-methyl-6-tert-butylphenol) serving as a polymerization inhibitor, and 11.50 g of tetraphenylphosphonium bromide serving as an esterification catalyst are charged to a 4-neck flask having a capacity of 5 L and equipped with a stirrer, a reflux condenser, an air conduit, and a thermometer, and subsequently stirred.

Then, the reaction series is let undergo reaction over 7 hours at 115° C. while a dry air is flown through the 4-neck flask at 30 ml/min, after which 2100 g of a styrene monomer serving as the reactive monomer is added, whereby a vinyl ester resin (hereinafter, referred to as the vinyl ester resin (I)) is obtained. The acid value of the vinyl ester resin (I) measured by a predetermined method is 5.0 mgKOH/g. Here, 0.600 g of 2,2-methylene-bis(4-methyl-6-tert-butylphenol) corresponds to 0.01 part with respect to 100 parts of the vinyl ester resin (I).

Then, 0.002 part of 4-hydroxy-2,2,6,6-tetramethylpiperidine-1-oxyl which is one kind of the N-oxyls is added to 100 parts of the vinyl ester resin (I), whereby a vinyl ester resin composition is obtained. The storable period and curing property of the resulting vinyl ester resin composition, and the coloring degrees of the same before the storage and right before the gelation are measured in the above-described manners. The major producing conditions of the vinyl ester resin composition and result of each test are set forth in Tables 1(a) and 1(b) below.

EXAMPLE 2

A vinyl ester resin composition is obtained by the same reaction and manipulation of Example 1 except that a mixing ratio of 4-hydroxy-2,2,6,6-tetramethylpiperidine-1-oxyl with respect to 100 parts of the vinyl ester resin (I) is changed to 0.01 part from 0.002 part. The storable period and curing property of the resulting vinyl ester resin composition, and the coloring degrees of the same before the storage and right before the gelation are measured in the above-described manners. The major producing conditions of the vinyl ester resin composition and result of each test are set forth in Tables 1(a) and 1(b) below.

EXAMPLE 3

A vinyl ester resin composition is obtained by the same reaction and manipulation of Example 1 except that 0.002 part of 4-methoxy-2,2,6,6-tetramethylpiperidine-1-oxyl which is one kind of the N-oxyls is used instead of 4-hydroxy-2,2,6,6-tetramethylpiperidine-1-oxyl. The storable period and curing property of the resulting vinyl ester resin composition, and the coloring degrees of the same before the storage and right before the gelation are measured in the above-described manners. The major producing conditions of the vinyl ester resin composition and result of each test are set forth in Tables 1(a) and 1(b) below.

EXAMPLE 4

Here, 2500 g of YD-901, 580 g of YD-127, 750 g of methacrylic acid, and 11.50 g of tetraphenylphosphonium bromide are charged to a 4-neck flask of the same type as the one used in Example 1. In addition, 0.04 part of 4-hydroxy-2,2,6,6-tetramethylpiperidine-1-oxyl with respect to 100 parts of the resulting vinyl ester resin is charged to the 4-neck flask, and the reaction series is stirred. Then, the reaction series is let undergo reaction over 7 hours at 115° C. while a dry nitrogen is flown through the 4-neck flask at 30 ml/min, after which 2100 g of a styrene monomer is added, whereby a vinyl ester resin composition is obtained.

The acid value of the resulting vinyl ester resin composition measured by a predetermined method is 5.0 mgKOH/g. The storable period and curing property of the resulting vinyl ester resin composition, and the coloring degrees of the same before the storage and right before the gelation are measured in the above-described manners. The major producing conditions of the vinyl ester resin composition and result of each test are set forth in Tables 1(a) and 1(b) below.

EXAMPLE 5

A vinyl ester resin composition is obtained by the same reaction and manipulation of Example 4 except that 0.04 part of 4-methoxy-2,2,6,6-tetramethylpiperidine-1-oxyl with respect to 100 parts of the resulting vinyl ester resin is charged to the 4-neck flask instead of 4-hydroxy-2,2,6,6-tetramethylpiperidine-1-oxyl.

The acid value of the resulting vinyl ester resin composition measured by a predetermined method is 5.0 mgKOH/g. The storable period and curing property of the resulting vinyl ester resin composition, and the coloring degrees of the same before the storage and right before the gelation are measured in the above-described manners. The major producing conditions of the vinyl ester resin composition and result of each test are set forth in Tables 1(a) and 1(b) below.

EXAMPLE 6

Here, 2500 g of YD-901, 580 g of YD-127, 750 g of methacrylic acid, and 11.50 g of tetraphenylphosphonium bromide are charged to a 4-neck flask of the same type as the one used in Example 1. In addition, 0.001 part of 4-hydroxy-2,2,6,6-tetramethylpiperidine-1-oxyl with respect to 100 parts of the resulting vinyl ester resin is charged to the 4-neck flask, and the reaction series is stirred. Then, the reaction series is let undergo reaction over 7 hours st 115° C. while a dry air is flown through the 4-neck flask at 30 ml/min.

Then, 0.02 part of 2,2-methylene-bis(4-methyl-6-tert-butylphenol) and 0.005 part of 2,2,6,6-tetramethylpiperidine with respect to 100 parts of the resulting vinyl ester resin are added, after which 2100 g of a styrene monomer is added, whereby a vinyl ester resin composition is obtained. The acid value of the resulting vinyl ester resin composition measured by a predetermined method is 5.0 mgKOH/g.

The storable period and curing property of the resulting vinyl ester resin composition, and the coloring degrees of the same before the storage and right before the gelation are measured in the above-described manners. The major producing conditions of the vinyl ester resin composition and result of each test are set forth in Tables 1(a) and 1(b) below.

Comparative Example 1

The storable period and curing property of the vinyl ester resin (I) obtained in the same manner as Example 1, and the coloring degrees of the same before the storage and right before the gelation are measured in the above-described manners. The major producing conditions of the vinyl ester resin (I) and result of each test are set forth in Tables 1(a) and 1(b) below.

Comparative Example 2

A comparative vinyl ester resin composition is obtained by adding 0.05 part of phenothiazine serving as a conventional polymerization inhibitor to 100 parts of the vinyl ester resin (I) obtained in the same manner as Example 1. The storable period and curing property of the comparative vinyl ester resin composition, and the coloring degrees of the same before the storage and right before the gelation are measured in the above-described manner. The major producing conditions of the comparative vinyl ester resin composition and result of each test are set forth in Tables 1(a) and 1(b) below.

Comparative Example 3

A comparative vinyl ester resin composition is obtained by adding 0.2 part of N-morpholinoacetoacetamide serving as a conventional polymerization inhibitor to 100 parts of the vinyl ester resin (I) obtained in the same manner as Example 1. The storable period and curing property of the comparative vinyl ester resin composition, and the coloring degree of the same before the storage and right before the gelation are measured in the above-described manners. The major producing conditions of the comparative vinyl ester resin composition and result of each test are set forth in Tables 1(a) and 1(b) below.

EXAMPLE 7

Here, 1500 g of hexamethylene diisocyanate which is one kind of polyisocyanate, 1400 g of a styrene monomer, 2.4 g of dibutyl tin dilaurate serving as a catalyst, and 240 mg of 4-hydroxy-2,2,6,6-tetramethylpiperidine-1-oxyl are charged to a 4-neck flask of the same type as the one used in Example 1, and subsequently stirred. Note that 240 mg of 4-hydroxy-2,2,6,6-tetramethylpiperidine-1-oxyl corresponds to 0.005 part with respect to an expected total weight of the resulting resin herein.

Then, the temperature inside the flask is raised to 60° C. while a dry air is flown therethrough at 30 ml/min, after which 590 g of dipropylene glycol which is one kind of the polyhydric alcohols is added to let the reaction solution undergo reaction over 3 hours while the temperature thereof is kept at 60° C.–70° C.

Then, 1270 g of hydroxypropylmethacrylate which is one kind of the (meth)acrylic compound containing a hydroxyl group is added to the reaction solution, and the reaction solution is let undergo reaction over 5 hours while the temperature thereof is raised and kept at 100° C., whereby an urethane(meth)acrylate resin (hereinafter, referred to as urethane(meth)acrylate resin (I)) is obtained.

Further, 0.02 part of 4-hydroxy-2,2,6,6-tetramethylpiperidine-1-oxyl is added to 100 parts of the urethane(meth)acrylate resin (I), whereby an urethane(meth) acrylate resin composition is obtained. The storable period and curing property of the resulting urethane(meth)acrylate resin composition, and the coloring degrees of the same before the storage and right before the gelation are measured in the above-described manners. The major producing conditions of the urethane(meth)acrylate resin composition and result of each test are set forth in Table 2 below.

EXAMPLE 8

Here, 310 g of ethylene glycol which is one kind of the polyhydric alcohols, 300 g of diethylene glycol, 320 g of dipropylene glycol, 700 g of phthalic anhydride and 520 g of maleic anhydride, each of which is one kind of the di-basic acid, are charged to a 4-neck flask having a capacity of 3L and equipped with a stirrer, a reflux condenser, an air conduit, and a thermometer, and subsequently stirred.

Then, the reaction series is let undergo reaction over 7 hours at 210° C. while a nitrogen gas is flown through the 4-neck flask at 30 ml/min, after which 1110 g of a styrene monomer is added, whereby an unsaturated polyester resin (hereinafter, referred to as the unsaturated polyester resin (I)) is obtained. The acid value of the unsaturated polyester resin (I) measured by a predetermined method is 43 mgKOH/g.

Then, 0.005 part of 4-hydroxy-2,2,6,6-tetramethylpiperidine-1-oxyl is added to 100 parts of the unsaturated polyester resin (I), whereby an unsaturated polyester resin composition is obtained. The storable period and curing property of the resulting unsaturated polyester resin composition, and the coloring degrees of the same before the storage and right before the gelation are measured in the above-described manners. The major producing conditions of the unsaturated polyester resin composition and result of each test are set forth in Table 3 below.

EXAMPLE 9

An unsaturated polyester resin composition is obtained through the same reaction and manipulation of Example 8 except that a mixing ratio of 4-hydroxy-2,2,6,6-tetramethylpiperidine-1-oxyl to the unsaturated polyester resin (I) is changed to 0.02 part from 0.005 part. The storable period and curing property of the resulting unsaturated polyester resin composition, and the coloring degrees of the same before the storage and right before the gelation are measured in the above-described manner. The major producing conditions of the unsaturated polyester resin composition and result of each test are set forth in Table 3 below.

EXAMPLE 10

An unsaturated polyester resin composition is obtained through the same reaction and manipulation of Example 8 except that 0.02 part of 4-methoxy-2,2,6,6-tetramethylpiperidine-1-oxyl is used instead of 4-hydroxy-2,2,6,6-tetramethylpiperidine-1-oxyl. The storable period and curing property of the resulting unsaturated polyester resin composition, and the coloring degrees of the same before the storage and right before the gelation are measured in the above-described manner. The major producing conditions of the unsaturated polyester resin composition and result of each test are set forth in Table 3 below.

Comparative Example 4

A comparative unsaturated polyester resin composition is obtained by adding 0.005 part of phenothiazine to 100 parts of the unsaturated polyester resin (I) obtained in the same manner as Example 8. The storable period and curing property of the comparative unsaturated polyester resin composition, and the coloring degrees of the same before the storage and right before the gelation are measured in the above-described manners. The major producing conditions of the comparative unsaturated polyester resin composition and result of each test are set forth in Table 3 below.

Comparative Example 5

A comparative unsaturated polyester resin composition is obtained by adding 0.005 part of 4-tert-butylcatechol serving as a conventional polymerization inhibitor to 100 parts of the unsaturated polyester resin (I) obtained in the same manner as Example 8. The storable period and curing property of the comparative unsaturated polyester resin composition, and the coloring degrees of the same before the storage and right before the gelation are measured in the above-described manners. The major producing conditions of the comparative unsaturated polyester resin composition and result of each test are set forth in Table 3 below.

EXAMPLE 11

Here, 1650 g of propylene glycol which is one kind of the polyhydric alcohols, 1800 g of isophthalic acid and 1720 g of maleic anhydride, each of which is one kind of the di-basic acid, are charged to a 4-neck flask of the same type as the one used in Example 1, and subsequently stirred. Then, the reaction series is let undergo reaction over 8 hours at 200° C. while a nitrogen gas is flown through the 4-neck flask at 30 ml/min, whereby an unsaturated polyester is obtained. The acid value of the unsaturated polyester measured by a predetermined method is 60 mgKOH/g.

Then, 0.03 part of 4-hydroxy-2,2,6,6-tetramethylpiperidine-1-oxyl and 650 g of glycidyl methacrylate which is one kind of the (meth)acrylic compound are added to 100 parts of the unsaturated polyester in the 4-neck flask, and the reaction series is let undergo reaction over 3 hours at 140° C. while a dry air is flown through the 4-neck flask at 30 ml/min, whereby a polyester(meth)acrylate resin composition is obtained.

The storable period and curing property of the resulting polyester(meth)acrylate resin composition, and the coloring degrees of the same before the storage and right before the gelation are measured in the above-described manners. The major producing conditions of the polyester(meth)acrylate resin composition and the result of each test are set forth in Table 4 below.

EXAMPLE 12

Here, 1650 g of propylene glycol, 1800 g of isophthalic acid, and 1720 g of maleic anhydride are charged to a 4-neck flask of the same type as the one used in Example 1, and subsequently stirred. Then, the reaction series is let undergo reaction over 8 hours at 200° C. while a nitrogen gas is flown through the 4-neck flask at 30 ml/min, whereby an unsaturated polyester is obtained. The acid value of the unsaturated polyester measured by a predetermined method is 60 mgKOH/g.

Then, 0.01 part of 2,2-methylene-bis(4-methyl-6-tert-butylphenol) and 650 g of glycidyl methacrylate are added to 100 parts of the unsaturated polyester in the 4-neck flask, and the reaction series is let undergo reaction over 3 hours at 140° C. while a dry air is flown through the 4-neck flask at 30 ml/min, whereby a polyester(meth)acrylate oligomer is synthesized. Further, 60 parts of the oligomer is mixed with 40 parts of styrene, whereby a polyester(meth)acrylate resin is obtained.

Subsequently, 0.02 part of 4-hydroxy-2,2,6,6-tetramethylpiperidine-1-oxyl is added to 100 parts of the polyester(meth)acryalte resin, whereby a polyester(meth) acrylate resin composition is obtained. The storable period and curing property of the resulting polyester(meth)acrylate resin composition, and the coloring degrees of the same before the storage and right before the gelation are measured in the above-described manners. The major producing conditions of the polyester(meth)acrylate resin composition and the result of each test are set forth in Table 4 below.

Comparative Example 6

A comparative polyester(meth)acrylate resin composition is obtained in the same manner as Example 12 except that 0.05 part of phenothiazine is used instead of 4-hydroxy-2,2,6,6-tetramethylpiperidine-1-oxyl. The storable period and curing property of the comparative polyester(meth)acrylate resin composition, and the coloring degrees of the same before the storage and right before the gelation are measured in the above-described manners. The major producing conditions of the comparative polyester(meth)acrylate resin composition and the result of each test are set forth in Table 4 below.

Comparative Example 7

A comparative polyester(meth)acrylate resin composition is obtained in the same manner as Example 12 except that 0.01 part of hydroquinone is used instead of 2,2-methylene-bis(4-methyl-6-tert-butylphenol), and 0.02 part of 4-tert-butyl catechol is used instead of 4-hydroxy-2,2,6,6-tetramethylpiperidine-1-oxyl. The storable period and curing property of the comparative polyester(meth)acrylate resin composition, and the coloring degrees of the same before the storage and right before the gelation are measured in the above-described manners. The major producing conditions of the comparative polyester(meth)acrylate resin composition and the result of each test are set forth in Table 4 below.

Tables 1–4 below reveal that the resin compositions of Examples in accordance with the present invention excel the resin compositions of Comparative Examples in both the storage stability and curing property, while being capable of suppressing the coloring over time.

Comparative Example 8

Here, 2500 g of YD-901, 580 g of YD-127, 480 g of methacrylic acid, 8.90 g of tetraphenylphosphonium and 1.20 g of 4-methoxyphenol serving as a known polymerization inhibitor are charged to a 4-neck flask of the same type as the one used in Example 1, and a comparative vinyl ester resin is obtained in the same manner as Example 1. The acid value of the comparative vinyl ester resin measured by a predetermined method is 5.0 mgKOH/g, and the Hazen color scale of the same is 120.

Comparative Example 9

A comparative vinyl ester resin is obtained in the same manner as Example 4 except that 1.20 g of hydroquinone is used as a known polymerization inhibitor instead of 4-hydroxy-2,2,6,6-tetramethylpiperidine-1-oxyl. The acid value of the comparative vinyl ester resin measured by a predetermined method is 5.0 mgKOH/g, and the Hazen color scale of the same is 800.

Comparative Example 10

The reaction and manipulation are carried out in the same manner as Example 4 except that 11.80 g of 4-methoxyphenol is used instead of 4-hydroxy-2,2,6,6-tetramethylpiperidine-1-oxyl and a nitrogen gas is used instead of air. Then, the reaction solution turned into gel 2 hours later since the reaction started.

Comparative Example 11

A comparative urethane(meth)acrylate resin is obtained in the same manner as Example 7 except that 1.20 g of 4-methoxyphenol is used instead of 4-hydroxy-2,2,6,6-tetramethylpiperidine-1-oxyl. The Hazen color scale of the comparative urethane(meth)acrylate resin is 200.

Comparative Example 12

The reaction and manipulation are carried out in the same manner as Example 7 except that 100 mg of 4-methoxyphenol is used instead of 4-hydroxy-2,2,6,6-tetramethylpiperidine-1-oxyl. Then, 1270 g of hydroxypropyl methacrylate is added, and the reaction solution is let undergo reaction while being kept at 100° C. Then, the reaction solution turns into gel 10 minutes later since the reaction started.

Comparative Example 13

A comparative polyester(meth)acrylate resin is obtained in the same manner as Example 11 except that 1.20 g of hydroquinone is used instead of 4-hydroxy-2,2,6,6-tetramethylpiperidine-1-oxyl. The Hazen color scale of the comparative polyester(meth)acrylate resin is 500.

Comparative Example 14

The reaction and manipulation are carried out in the same manner as Example 11 except that 100 mg of hydroquinone is used instead of 4-hydroxy-2,2,6,6-tetramethylpiperidine-1-oxyl. During the process, the glycidyl methacrylate is added and let the reaction solution undergo reaction at 140° C. while a dry air is flown through the 4-neck flask at 30 ml/min. Then, the reaction solution turns into gel 15 minutes later.

The results of Examples 1–12 and Comparative Examples 1–14 reveal that the producing process of the resin composition of the present invention is suitable as a producing process of a thermosetting resin composition which does not turn into gel during the producing step and can suppress the coloring.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

TABLE 1(a)

| | | EXAMPLE | | | | | | COMPARATIVE EXAMPLE | | |
|---|---|---|---|---|---|---|---|---|---|---|
| | | 1 | 2 | 3 | 4 | 5 | 6 | 1 | 2 | 3 |
| HTMPO (PART) | ADDED AMOUNT DURING REACTION | — | — | — | 0.04 | — | 0.001 | — | — | — |
| | ADDED AMOUNT AFTER REACTION | 0.002 | 0.01 | — | — | — | — | — | — | — |
| MTMPO (PART) | ADDED AMOUNT DURING REACTION | — | — | — | — | 0.04 | — | — | — | — |
| | ADDED AMOUNT | — | — | 0.002 | — | — | — | — | — | — |

TABLE 1(a)-continued

| | | EXAMPLE | | | | | | COMPARATIVE EXAMPLE | | |
|---|---|---|---|---|---|---|---|---|---|---|
| | | 1 | 2 | 3 | 4 | 5 | 6 | 1 | 2 | 3 |
| | AFTER REACTION | | | | | | | | | |
| MBMBP (PART) | ADDED AMOUNT DURING REACTION | 0.01 | 0.01 | 0.01 | — | — | — | 0.01 | 0.01 | 0.01 |
| | ADDED AMOUNT AFTER REACTION | — | — | — | — | — | 0.02 | — | — | — |
| TMP (PART) | | — | — | — | — | — | 0.005 | — | — | — |
| PHENOTHIAZINE (PART) | | — | — | — | — | — | — | — | 0.05 | — |
| N-MORPHOLINO-ACETOACETAMIDE (PART) | | — | — | — | — | — | — | — | — | 0.2 |

HTMPO: 4-hydroxy-2,2,6,6-tetramethylpiperidine-1-oxyl
MTMPO: 4-methoxy-2,2,6,6-tetramethylpiperidine-1-oxyl
MBMBP: 2,2-methylene-bis(4-methyl-6-tert-butylphenol)
TMP: 2,2,6,6-tetramethylpiperidine TABLE 1(b)

| | | EXAMPLE | | | | | | COMPARATIVE EXAMPLE | | |
|---|---|---|---|---|---|---|---|---|---|---|
| | | 1 | 2 | 3 | 4 | 5 | 6 | 1 | 2 | 3 |
| GELATION TIME (MIN.) | | 2.4 | 4.2 | 2.7 | 2.4 | 2.7 | 2.8 | 2.2 | 4.6 | 5.5 |
| MINIMUM CURING TIME (MIN.) | | 3.5 | 5.9 | 3.9 | 3.5 | 3.9 | 4.1 | 3.3 | 6.3 | 7.3 |
| MAXIMUM EXOTHERMIC TEMPERATE (° C.) | | 195 | 198 | 198 | 195 | 198 | 198 | 199 | 188 | 188 |
| 60° C. | STORABLE PERIOD (DAYS) | 10 | 16 | 10 | 7 | 7 | 15 | 1 | 6 | 6 |
| | HAZEN COLOR SCALE BEFORE STORAGE | 20 | 50 | 20 | 10 | 10 | 20 | 10 | >1000 | 70 |
| | HAZEN COLOR SCALE RIGHT BEFORE GELATION | 20 | 50 | 20 | 10 | 10 | 20 | 10 | >1000 | >1000 |
| 40° C. | STORABLE PERIOD (DAYS) | 85 | 130 | 90 | 60 | 63 | 100 | 10 | 45 | 48 |
| | HAZEN COLOR SCALE BEFORE STORAGE | 20 | 50 | 20 | 10 | 10 | 20 | 10 | >1000 | 70 |
| | HAZEN COLOR SCALE RIGHT BEFORE GELATION | 20 | 50 | 20 | 10 | 10 | 20 | 10 | >1000 | >1000 |

TABLE 2

| | | EXAMPLE 7 |
|---|---|---|
| 4-HYDROXY-2,2,6,6-TETRAMETHYL-PIPERIDINE-1-OXYL | ADDED AMOUNT DURING REACTION (PART) | 0.005 |
| | ADDED AMOUNT AFTER REACTION (PART) | 0.02 |
| GELATION TIME (MIN.) | | 5.0 |
| MINIMUM CURING TIME (MIN.) | | 6.8 |
| MAXIMUM EXOTHERMIC TEMPERATURE (° C.) | | 200 |
| 60° C. | STORABLE PERIOD (DAYS) | 16 |
| | HAZEN COLOR SCALE BEFORE STORAGE | 20 |
| | HAZEN COLOR SCALE RIGHT BEFORE GELATION | 20 |
| 40° C. | STORABLE PERIOD (DAYS) | 138 |
| | HAZEN COLOR SCALE BEFORE STORAGE | 20 |
| | HAZEN COLOR SCALE RIGHT BEFORE GELATION | 20 |

TABLE 3

| | EXAMPLE | | | COMPARATIVE EXAMPLE | |
|---|---|---|---|---|---|
| | 8 | 9 | 10 | 4 | 5 |
| HTMPO (PART) | 0.005 | 0.02 | — | — | — |
| MTMPO (PART) | — | — | 0.02 | — | — |
| PHENOTHIAZINE (PART) | — | — | — | 0.005 | — |
| 4-TERT-BUTYL CATECHOL (PART) | — | — | — | — | 0.005 |
| GELATION TIME (MIN.) | 4.8 | 9.7 | 9.7 | 1.2 | 1.3 |
| MINIMUM CURING TIME (MIN.) | 10.6 | 15.3 | 14.8 | 6.3 | 6.6 |
| MAXIMUM EXOTHERMIC TEMPERATURE (° C.) | 172 | 172 | 172 | 170 | 168 |

TABLE 3-continued

| | | EXAMPLE | | | COMPARATIVE EXAMPLE | |
|---|---|---|---|---|---|---|
| | | 8 | 9 | 10 | 4 | 5 |
| 60° C. | STORABLE PERIOD (DAYS) | 40 | 80 | 70 | 40 | 40 |
| | HAZEN BEFORE STORAGE | 20 | 50 | 50 | 30 | 200 |
| | COLOR RIGHT BEFORE GELATION SCALE | 20 | 50 | 50 | >1000 | >1000 |
| 40° C. | STORABLE PERIOD (DAYS) | 200 | 350 | 320 | 200 | 210 |
| | HAZEN BEFORE STORAGE | 20 | 50 | 50 | 30 | 200 |
| | COLOR RIGHT BEFORE GELATION SCALE | 20 | 50 | 50 | >1000 | >1000 |

HTMPO: 4-hydroxy-2,2,6,6-tetramethylpiperidine-1-oxyl
MTMPO: 4-methoxy-2,2,6,6-tetramethylpiperidine-1-oxyl

TABLE 4

| | | EXAMPLE | | COMPARATIVE EXAMPLE | |
|---|---|---|---|---|---|
| | | 11 | 12 | 6 | 7 |
| HTMPO | ADDED AMOUNT DURING REACTION (PART) | 0.03 | — | — | — |
| | ADDED AMOUNT AFTER REACTION (PART) | — | 0.02 | — | — |
| MBMBP (PART) | | — | 0.01 | 0.01 | — |
| PHENOTHIAZINE (PART) | | — | — | 0.05 | — |
| HYDROQUINONE (PART) | | — | — | — | 0.01 |
| 4-TERT-BUTYL CATECHOL (PART) | | — | — | — | 0.02 |
| GELATION TIME (MIN.) | | 5.0 | 4.3 | 8.5 | 10.1 |
| MINIMUM CURING TIME (MIN.) | | 6.8 | 5.9 | 10.7 | 15.3 |
| MAXIMUM EXOTHERMIC TEMPERATURE (° C.) | | 180 | 180 | 172 | 155 |
| 60° C. | STORABLE PERIOD (DAYS) | 30 | 20 | 8 | 10 |
| | HAZEN BEFORE STORAGE | 20 | 20 | >1000 | 600 |
| | COLOR RIGHT BEFORE GELATION SCALE | 20 | 20 | >1000 | >1000 |
| 40° C. | STORABLE PERIOD (DAYS) | 150 | 80 | 32 | 40 |
| | HAZEN BEFORE STORAGE | 20 | 20 | >1000 | 600 |
| | COLOR RIGHT BEFORE GELATION SCALE | 20 | 20 | >1000 | >1000 |

HTMPO: 4-hydroxy-2,2,6,6-tetramethylpiperidine-1-oxyl
MBMBP: 2,2-methylene-bis(4-methyl-6-tert-butylphenol)

What is claimed is:

1. A thermosetting resin composition comprising N-oxyls and a synthetic resin selected from the group consisting of a vinyl ester resin and a urethane(meth)acrylate resin wherein N-oxyl is represented by the formula (1):

(1)

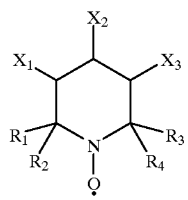

where each $X_1$, $X_2$ and $X_3$ represents a hydrogen atom or an —$OR_5$ group where $R_5$ represents a hydrogen atom or an alkyl group having up to 16 carbon atoms, and each $R_1$, $R_2$, $R_3$, and $R_4$ represents an alkyl group having at least one carbon atom.

2. The thermosetting resin composition of claim 1, wherein the resin is a vinyl ester resin.

3. The thermosetting resin composition of claim 1, wherein the resin is a urethane(meth)acrylate resin.

4. The thermosetting resin composition of claim 1, wherein the ratio of said N-oxyl per 100 parts by weight of said synthetic resin is in a range between 0.00001 part by weight and 1 part by weight.

5. The thermosetting resin composition of claim 1, wherein:

the storable period of said composition at 60° C. is a week or longer;

the coloring degree of said composition is no more than 100 in the Hazen color scale;

the coloring degree of said composition before storage at 60° C. and the coloring degree of said composition right before gelation when stored at 60° are no more than 100 in the Hazen color scale;

the difference between the coloring degrees in the Hazen color scale right before gelation when stored at 60° C. and before storage at 60° C. is no more than 20; and the maximum exothermic temperature of said composition is 100° C. or higher while a curing property of a mixture of 1 part by weight of 1,1,3,3-tetramethylbutylperoxy-2-ethylhexylhexanoate and 100 parts by weight of said composition are measured at 70° C.

6. A process for producing a thermosetting resin according to claim 1 by reacting a vinyl ester resin or a urethane (meth)acrylate resin in the presence of N-oxyls.

* * * * *